Patented Jan. 23, 1923.

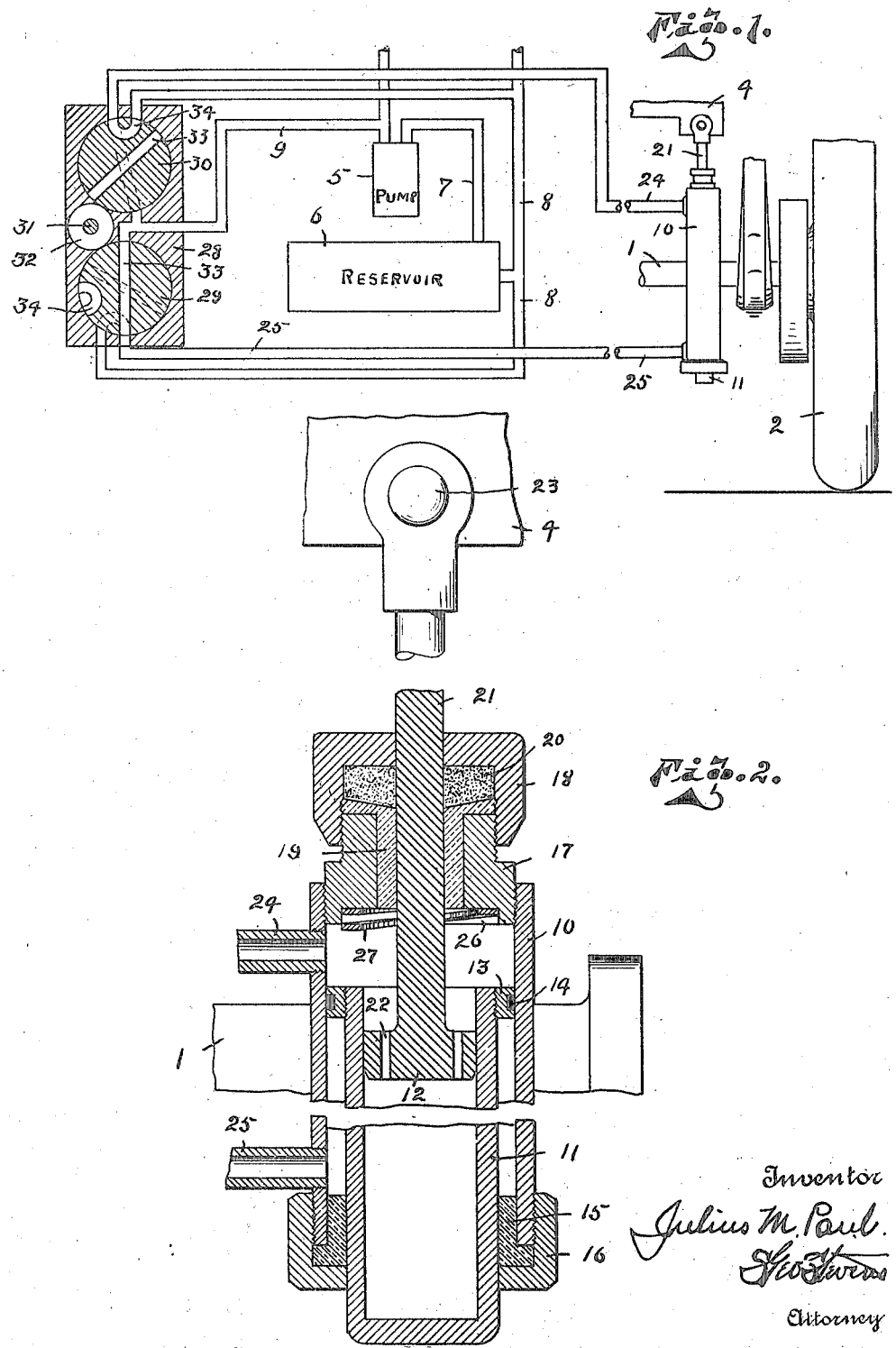

1,442,968

UNITED STATES PATENT OFFICE.

JULIUS M. PAUL, OF DULUTH, MINNESOTA.

COMBINATION JACK AND SHOCK ABSORBER FOR AUTOMOBILES.

Application filed December 16, 1921. Serial No. 522,869.

*To all whom it may concern:*

Be it known that I, JULIUS M. PAUL, a citizen of the United States, residing at Duluth, in the county of St. Louis and State of Minnesota, have invented certain new and useful Improvements in Combination Jacks and Shock Absorbers for Automobiles, of which the following is a specification, reference being had therein to the accompanying drawing.

This invention relates to automobile attachments and has special reference to a combination jack and shock absorber.

The principal object is to produce a novel combination of this character which may be conveniently employed in the jacking up of the automobile in its entirety or any one of the wheels thereof individually and at the same time provide adequate shock absorbing means cooperative therewith.

Other objects and advantages will appear in the further description of the invention.

Referring to the accompanying drawing forming part of this application in which like reference characters indicate like parts:

Figure 1 is a diagrammatic illustration of one of the combination jack and absorbing devices, and Figure 2 is an enlarged, broken, central, vertical, sectional view through one of the combination jack and absorbing cylinders.

1 represents the axle of an automobile and 2 one of the wheels thereof, and, firmly secured in any desired manner to the axles of the automobile, one adjacent each wheel thereof, are the vertically disposed combination jack and absorbing cylinders 10, only one of which and the valve operating mechanism therefor is shown in the drawing.

4. Represents a fragmental portion of the body of the automobile which is supported upon springs in the usual manner, and the reciprocal motion of which it is desirable to retard, as by a shock absorber.

I shall now proceed to describe the construction and operation of one of the combination cylinders and its cooperative parts, it being understood, as previously stated, that there is one of the combination jacks at each corner of the car, there being a common pump 5 and reservoir 6, the feed pipe to the pump from the reservoir being illustrated at 7, the return pipe to the reservoir from the combination cylinder being indicated at 8, and the feed pipe to the combination cylinder from the pump is illustrated at 9.

10 represents the combination jack and shock absorber cylinder which is elongated vertically, and carries therewithin the reciprocal jack piston 11, the latter also being in the form of a hollow cylinder, the interior of which carries the reciprocal shock absorbing piston 12. The jack piston 11 is smaller in diameter than the interior of the cylinder 10 and carries at its upper end an annular enlargement 13 in which is mounted a suitable packing ring 14 to result in a tight connection between the jacking piston and the cylinder 10. A bushing or sleeve 15 is inserted within the lower end of the cylinder 10 and surrounds the jacking piston 11 making a suitable guide therefor which may carry any form of suitable packing to prevent leakage, and a cap 16 is shown as screw threadedly mounted externally of the lower end of the cylinder 10 for holding the bushing in place.

Within the upper end of the cylinder 10 is screw threadedly mounted the plug 17 the upper end of which is somewhat reduced in diameter and carries externally screw threaded thereupon the cap 18. Within the plug 17 is carried a sleeve 19, similar to the sleeve 15, and any desired form of packing such as illustrated at 20 may be employed for forming a tight joint about the piston rod 21 of the piston 12. The piston 12 has formed therethrough vertically a plurality of holes 22, they being for the escape of the fluid, which I prefer shall be oil, so as to govern the reciprocal motion of the piston as it is raised and lowered by the movement of the body of the car. The upper end of the piston rod 21 is pivotally attached in any desired manner, as at 23, to the body 4 of the car, and thus when the cylinder 10 is full of oil and the piston 11 in its uppermost position the motion of the body 4 of the vehicle will be retarded by the sluggist motion of the piston rod 21 due to its churning effect in the oil in the hollow piston 11.

The pipe connections to the piston 10 are illustrated at 24 and 25, the latter being adjacent the lower end of the cylinder and the former adjacent the upper end. The inner face of the plug 17 is recessed as at 26 and within this recess is mounted a flat expansive spring 27. This spring is for the purpose of engaging the upper end of the jack piston 11 when it is forced upwardly thereagainst, and the pipe connection 24 is so spaced below the inner face of the plug 17 as to permit of the enlargement of the ring 13 on the jack piston to slightly pass the entrance of said pipe connection when liquid is being forced into the cylinder 10 below said ring or enlargement for the purpose of raising the jack piston to its uppermost position. When this occurs the spring 27 will be compressed and such escape of liquid through the pipe 24 may continue so long as the pump is in operation, thus preventing any possibility of damaging any part of the mechanism provided the pump is not stopped at the proper time. Then when the pump is stopped, the action of the spring 27 will tend to depress the jack piston slightly closing the escape through the pipe 24 and allowing the jack piston to remain in such position. When the pump is again started and the control valve, which will be described later, so adjusted as to admit the liquid through the pipe 24 it will be discharged into the cylinder above the jack piston 11 forcing it downwardly until the latter engages the ground or block provided for the purpose, when a continued action of the pump will raise that portion of the vehicle as is obvious, and it is immaterial as to the relative position of the pistons 11 and 12 for during such time as when the jack is being employed as such the shock absorbing means is not required.

The pump 5 may be of any desired construction and operated and controlled as for example electrically, though this feature does not form part of my present invention. However the controlling device for the passage of the liquid to and from each cylinder 10 comprises a novel form of valve arrangement, the body portion of which is illustrated at 28, within which are located two spaced rotative port or passage controlling members or spigots 29 and 30. These members are rotated simultaneously by any desired form of mechanism such as gearing controlled by a central hand operated shaft or stem 31, the gear of which is diagrammatically suggested at 32. Each spigot 29 and 30 has formed diametrically therethrough a passageway 33, and, to one side of this passageway, is an arcuately shaped passageway 34 in each spigot. These passageways are so arranged that when the diametrical one 33 in one spigot is communicating with the force feed pipe 9, the passageway 33 in the other spigot will be shut off from any communication with the circulating system, though the arcuately shaped passageway 34 in the last mentioned spigot will be in communication with the reservoir pipe line 8. In the illustration shown in Figure 1 of the drawing I have shown the spigot 29 as opening the communication between the force feed pipe 9 from the pump, and the pipe 25 leading to the lowermost end of the cylinder 10 in which position, if the pump is operated the jack piston 10 will remain in its uppermost position as for example when the automobile is in ordinary service, and at which time the shock absorbing mechanism is in operative position as previously described.

Now should it become desirable to raise the wheel 2 from the ground by jacking up that corner of the car valve control stem 31 may be turned so as to rotate the spigots with the passageways therein to the position shown in dotted lines in Figure 1 when the communication will be open through the spigot 30 between the force feed pipe 9 from the pump and the supply pipe 24 to the cylinder 10. Then if the pump is started the liquid will be forced into the cylinder 10 crowding the jacking piston 11 downwardly to its lowermost or any intermediate desired position and at which time the liquid below the annular piston ring 13 and within the cylinder 10 will be forced outwardly through the pipe 25 and the arcuately shaped passageway 34 in the spigot 29 and through the pipe 8 to the reservoir 6.

No provision is made for the initial upward return motion of the jack piston as it is quite obvious that since the controlling valve is operated so as to permit of the escape of the liquid under pressure which is holding the vehicle jacked up, the weight thereof will cause the jacking piston to raise sufficiently above the entrance of the supply pipe 25, connected to the cylinder 10, to provide the proper communication therewith for forcibly raising said jacking piston.

It is to be understood that there is to be provided a valve control arrangement such as just described for each one of the cylinders 10, so that any one of them, or all, may be operated as desired, and the pump controlled independently thereof.

Having thus described my invention, what I claim and desire to secure by Letters Patent, is:

1. A device of the character described for vehicles comprising an upright cylinder rigidly carried on the axle of the vehicle, means for supplying liquid under pressure to both ends of the cylinder, and a jacking piston within the cylinder reciprocable in either direction by the action of the liquid.

2. A combined jack and shock absorber for vehicles comprising an upright cylinder rigidly carried on the axle of the vehicle, means for supplying liquid under pressure to both ends of the cylinder, a hollow jacking piston within the cylinder reciprocable in either direction by the action of the liquid, means whereby the jacking cylinder normally remains full of the liquid, and a shock absorbing piston operable within the jacking piston permanently attached to the frame of the vehicle above the axle, substantially as and for the purpose described.

3. A combined jack and shock absorber for vehicles comprising a cooperatively combined telescopic jacking and shock absorbing cylinder adjacent one or more wheels of the vehicle, means for supplying liquid under pressure to both ends of the cylinder, a double control valve for the liquid supply to each cylinder whereby to optionally cause the device to function as a jack or as a shock absorber.

In testimony whereof I hereunto affix my signature in the presence of two witnesses.

JULIUS M. PAUL.

Witnesses:
S. C. BRONSON,
S. GEO. STEVENS.